(12) United States Patent  
Ilnicki et al.

(10) Patent No.: US 7,689,854 B2
(45) Date of Patent: Mar. 30, 2010

(54) METHOD AND APPARATUS FOR ESTABLISHING IEEE 1588 CLOCK SYNCHRONIZATION ACROSS A NETWORK ELEMENT COMPRISING FIRST AND SECOND COOPERATING SMART INTERFACE CONVERTERS WRAPPING THE NETWORK ELEMENT

(75) Inventors: Slawomir K. Ilnicki, Los Altos Hills, CA (US); Takashi Hidai, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 588 days.

(21) Appl. No.: 11/534,262

(22) Filed: Sep. 22, 2006

(65) Prior Publication Data

US 2008/0075217 A1 Mar. 27, 2008

(51) Int. Cl.
*G06F 1/12* (2006.01)
*H04J 3/06* (2006.01)
(52) U.S. Cl. .................. 713/400; 713/401; 370/350
(58) Field of Classification Search ................. 713/400, 713/401
See application file for complete search history.

(56) References Cited

U.S. PATENT DOCUMENTS

| | | | |
|---|---|---|---|
| 6,665,316 B1 | 12/2003 | Eidson | |
| 6,757,304 B1 * | 6/2004 | Nomura et al. | 370/516 |
| 7,174,474 B1 * | 2/2007 | Low | 713/401 |
| 7,203,174 B2 * | 4/2007 | Huff | 370/248 |
| 7,242,693 B1 * | 7/2007 | Acharya et al. | 370/445 |
| 7,366,205 B2 | 4/2008 | Arnold et al. | |
| 7,447,931 B1 * | 11/2008 | Rischar et al. | 713/400 |
| 2003/0002483 A1 | 1/2003 | Zwack | |
| 2005/0207387 A1 | 9/2005 | Middleton et al. | |
| 2006/0256820 A1 * | 11/2006 | Ilnicki et al. | 370/503 |

FOREIGN PATENT DOCUMENTS

| | | |
|---|---|---|
| DE | 10229110 | 4/2003 |
| WO | 02054662 | 7/2002 |
| WO | 04002031 | 12/2003 |

OTHER PUBLICATIONS

Kannisto et al, Precision Time Protocol Prototype on Wireless LAN, 2004, Tampere University of Technology Korkeakoulunkatu, Finland, pp. 1236-1245.*
IEEE, IEEE Standard for a Precision Clock Synchronization Protocol for Networked Measurement and Control Systems, Nov. 8, 2002, IEEE, pp. 5.*
Germany Patent and Trademark Office, Office Action dated Dec. 3, 2008.
Schoppe Zimmermann Stoeckeler und Zinkler, English translation of the German Office Action dated Dec. 3, 2008.

* cited by examiner

*Primary Examiner*—Suresh K Suryawanshi

(57) ABSTRACT

Apparatus for making legacy network elements transparent to IEEE 1588 Precision Time Protocol operation. Network elements are wrapped by device(s) capable of providing either transparent clock or boundary clock operation. In one embodiment, smart interface converters are used to provide transparent clock or boundary clock operation. The smart interface converters work cooperatively.

26 Claims, 3 Drawing Sheets

METHOD AND APPARATUS FOR ESTABLISHING IEEE 1588 CLOCK SYNCHRONIZATION ACROSS A NETWORK ELEMENT COMPRISING FIRST AND SECOND COOPERATING SMART INTERFACE CONVERTERS WRAPPING THE NETWORK ELEMENT

TECHNICAL FIELD

Embodiments in accordance with the present invention relate to time synchronization in computer networks, and more particularly, to IEEE 1588 time synchronization across network switches, hubs, and routers.

BACKGROUND

Achieving time synchronization in computer networking is still a challenging task. Different elements of the network, such as PCs, workstations, servers, and devices such as routers and switches, and even VoIP phones today use NTP (Network Time Protocol) to get and set their epoch (time) from network-based NTP servers. NTP provides time accuracy on the order of tens of milliseconds. In most cases, this is sufficient.

In areas such as test and process automation, requirements are more strict, requiring time synchronization between networked devices on the order of sub-microsecond accuracy.

This may be accomplished by using GPS-based solutions. However, even if the cost of GPS-based equipment at each node is acceptable, delivery of GPS signals to each location is often not practical, due to the cost of cabling, or due to the requirement of an antenna with a clear view of the necessary number of GPS satellites. When used, though, GPS can provide time synchronization on the order of 50 nanoseconds.

In test and measurement applications, such as measuring one-way packet delays in networks, accuracy on the order of sub-milliseconds is required. Deploying GPS at various points in a network to perform the required network measurements is economically and practically feasible. When it could be envisioned that a region of a computer network might have a few GPS receivers, it would not be practical to equip all network elements with direct access to GPS accuracy.

In recent years the process automation industry has started deploying the IEEE 1588 standard (IEEE 1588-2002, incorporated herein by reference and referred to as 1588) to perform time synchronization between various devices. Unfortunately, in its current form 1588 is limited to very small networks, typically a LAN segment. IEEE 1588 makes the assumption that delays introduced by network elements are symmetrical and uniform. In order for IEEE 1588 to be deployed across wide area networks (WANs), significant investment is required in IEEE 1588 compliant network elements such as switches, hubs, routers, and the like.

There are two methods known in IEEE 1588 to deal with varying and asymmetrical delays at the network switching and routing elements. These delays occur naturally due to the nature of packet-switched traffic. As packets arrive at ports of a network element such as a router or switch, they must be identified and queued to the proper destination. This process introduces variable delays, particularly if multiple packets are queued for the same destination. One method of reducing these delays is to use a boundary clock, and another is to use a transparent clock.

In examining the boundary clock solution, first consider an IEEE 1588 master clock in device A directly connected to an IEEE 1588 slave clock in device B. IEEE 1588 precision time protocol (PTP) messages pass between A and B, establishing and maintaining B's clock in synchrony with A. Introducing a network element such as a router or switch between A and B introduces additional, varying delays in the propagation of IEEE 1588 messages. With a boundary clock, the network element (usually a switch or a router) runs the IEEE 1588 PTP protocol, and is synchronized to an attached master clock, as an example, device A. The boundary clock in turn acts as a master clock to all attached slaves, as an example, device B. Boundary clocks do not pass IEEE 1588 PTP messages.

The boundary clock solution requires the network element at the MAC/PHY level to redirect IEEE 1588 signals to the built-in boundary clock. If multiple network elements are present in the path between devices A and B, all these network elements must provide boundary clock capabilities.

A transparent clock passes IEEE 1588 messages, but either intercepts and modifies some of these messages to account for delays introduced by the network element, or sends follow-up messages containing IEEE 1588 packet delay information. One implementation of a transparent switch calculates how much time a SYNC packet spends in the network element, and then modifies the timestamp of the associated FOLLOW UP packet to account for this delay; similarly, the switch calculates how much time the DELAY REQ packet spends in the network, and modifies the timestamp of the associated DELAY RES packet. The transparent clock functionality must be built into the network element.

Such solutions become more complex when multiple network elements may intervene between an IEEE 1588 master clock and IEEE 1588 slave clocks.

SUMMARY OF THE INVENTION

Delays to IEEE 1588 time protocol packets caused by network elements are compensated for by an external device that wraps the legacy network elements with cooperating smart interface converters.

In a first embodiment, a transparent clock is provided. The smart interface converters timestamp certain IEEE 1588 packets, and either modify the timestamps in IEEE 1588 packets, or send calculated delays as part of IEEE 1588 packets. The smart interface converter connected to the IEEE 1588 master clock may support more than one smart interface converter slave. An out of band link may be used to synchronize smart interface converter clocks.

In a second embodiment, a boundary clock is formed by connecting smart interface converters to legacy network elements. One smart interface converter paired with an IEEE 1588 master clock acts as a IEEE 1588 slave. One or more additional smart interface converters act as IEEE 1588 master clocks supporting IEEE 1588 slave clocks. In some implementations, the 1588 slave smart interface converter sends synchronization pulses to the IEEE 1588 master smart interface converters using an out of band link, and periodically sends EPOCH packets to maintain synchronized clocks.

DETAILED DESCRIPTION OF THE EMBODIMENTS

Network elements such as switches, routers, and the like introduce variable and unpredictable delays in packet traffic, including IEEE 1588 precision time protocol (PTP) traffic. The present invention provides network independent devices which wrap legacy network elements and provide IEEE 1588 network element delay transparency. This transparency may be provided in a distributed fashion by wrapping the network elements with cooperating smart interface converters (hereafter SIC).

Standard interface converters are pluggable building blocks used in many networking devices such as switches, hubs, routers, and the like, and are used to convert high speed signals from a first medium to a second medium. As an example, one popular type of standard interface converter known as a GBIC converts signals from optical to electrical form; optical signals carried on fiber optic cables being used to communicate over the network, and electrical signals being used within the device housing the GBIC. Other forms convert signals from twisted-pair copper conductors used in high-speed networks to electrical signals suitable for the network device.

A smart interface converter (SIC) is a standard interface converter with additional logic allowing it to process packets on the fly. This additional logic may include the ability to query the status of the SIC, perform internal tests, and/or perform data capture and analysis. The SIC device also adds the ability to inject data packets into the high speed data stream, and to modify the contents of data packets on the fly. Further details of SIC devices are described in detail in "A Method of Creating Low-Bandwidth Channel within a Packet Stream," application Ser. No. 10/688,340, filed Oct. 17, 2003, the entire disclosure of which is hereby incorporated by reference.

Figure 1:
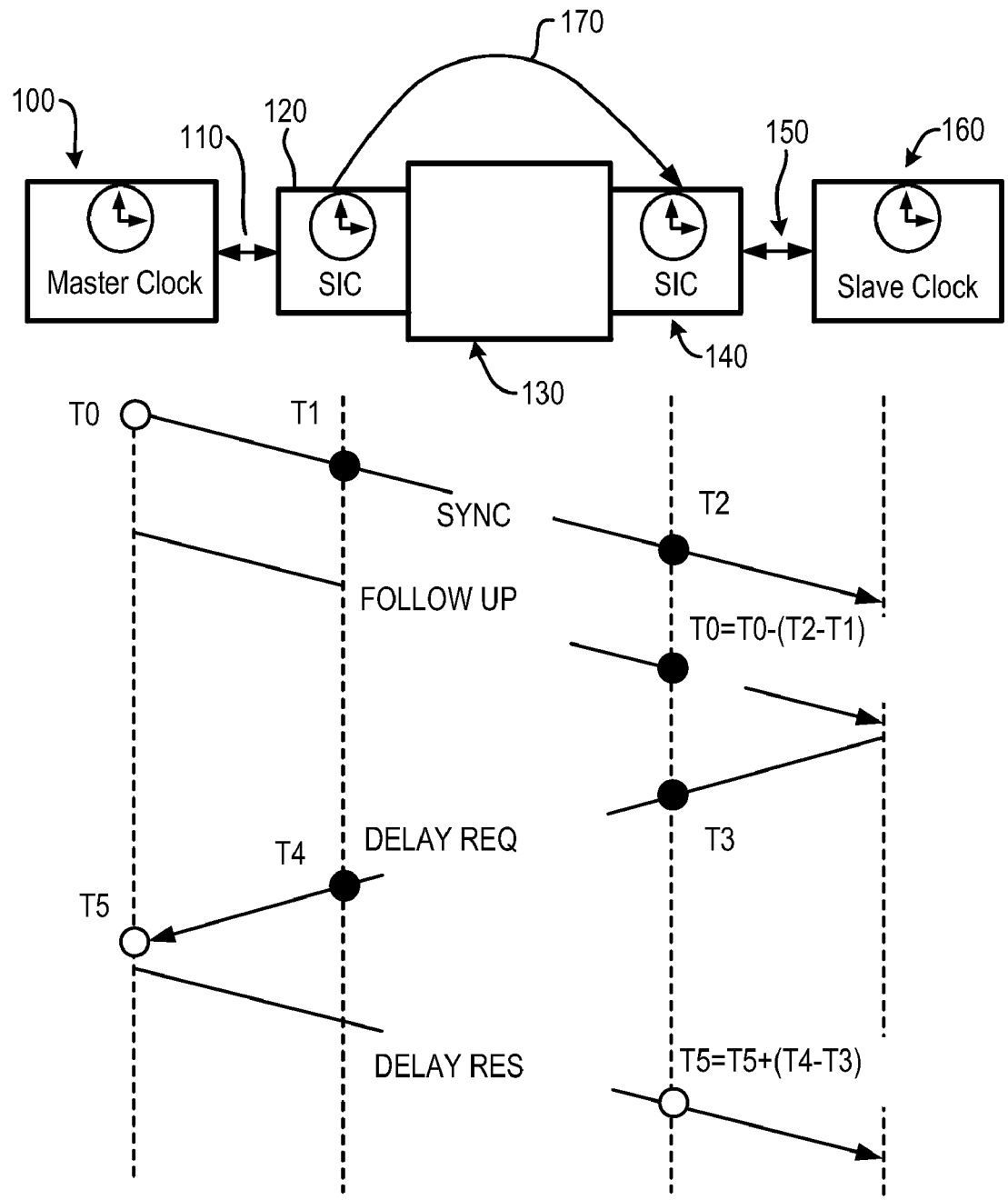
FIG. 1 shows a first system diagram.

A first embodiment of the present invention is shown in FIG. 1. This embodiment provides a distributed transparent clock which is wrapped around single or multiple network elements such as routers, switches, and the like. The network elements may be legacy equipment that are not IEEE 1588 aware. Distributed operation is performed by at least two cooperating SICs. Each cooperating SIC timestamps IEEE 1588 SYNC and DELAY REQ packets. The cooperating SICs modify FOLLOW UP and DELAY RESP packets on the fly by adjusting their timestamps.

IEEE 1588 master clock 100 communicates 110 to smart interface converter (SIC) 120. SIC 120 communicates with network elements 130, which may be one or more switches, routers, or the like. SIC 140 also communicates with network elements 130, and communicates 150 with IEEE 1588 slave clock 160. SIC 120, a designated master clock for out of band local clock synchronization with other SIC devices, also sends timing signals via out of band channel 170 to SIC 140. Communications paths 110 and 150 are preferably Ethernet links. Out of band channel 170 may be a coaxial cable, or other signaling medium such as a fiber optic link, free radiating optical link, or RF link. SIC 120 and SIC 140 pass packet traffic bidirectionally. While FIG. 1 shows a single master SIC 120 and a single slave SIC 140, multiple slave SICs may be present.

Referring to the timing diagram in FIG. 1, Master clock 100 sends SYNC packet at time T0. This packet passes through SIC 120 where it is timestamped at time T1. The SYNC packet passes through SIC 120 and network element 130 to SIC 140. SIC 140 takes another timestamp at time T2. According to the IEEE 1588 PTP protocol Master clock 100 sends a FOLLOW UP packet containing original timestamp T0. Because packets such as SYNC could be delayed by an unpredictable time interval at network element 130, according to the present invention, the FOLLOW UP packet is modified on the fly when it passes through SIC 120, including the T1 timestamp in the FOLLOW UP packet. When the FOLLOW UP packet passes through SIC 140, the original T0 timestamp is modified by adjusting for the delay, i.e. T0=T0−(T2−T1) and inserted back into the FOLLOW UP packet on the fly, and passed to IEEE 1588 slave 160. Similar processing takes place with the DELAY REQ and DELAY RES packets.

In an alternative embodiment, rather than modifying FOLLOW UP and DELAY RES packets, packets containing the necessary timestamps and sequence ID information between the SICs. As an example, rather than have SIC 120 modify the FOLLOW UP packet with timestamp T1, SIC 120 could send a packet containing the proper sequence ID and the T1 timestamp to SIC 140. Then Sic 140 could calculate network element delays for the SYNC/DELAY REQ packets, and pass this data to IEEE 1588 slave 160.

In order to provide accurate timestamping, SICs 120 and 140 synchronize their local clocks with each other via out of band channel 170. In one embodiment, a coaxial cable is used. An optical cable may be used, or free-radiating signals such as RF or optical signals may be used. If SIC 120 and 140 are co-located, for example in the same enclosure, channel 170 may be a simple electrical connection or a trace on a printed circuit board interconnecting the devices.

One of the SIC devices, SIC 120 in the example shown, is designated as a master for clock synchronization sends a periodic strobe pulse to synchronize the frequencies of other SIC device clocks. In addition, on a periodic basis such as once per second or some defined interval, a special strobe signal is sent out to indicate a time boundary condition. Upon receiving the special strobe signal, the slave SIC devices adjust their local clocks to the appropriate time boundary accordingly. As an example, in a given implementation SIC 120 sends out a strobe pulse every 1.6 microseconds. This periodic strobe allows other SIC devices to synchronize their clock frequencies. Once per second SIC 120 sends out a special strobe which instructs the other SIC devices to set the fractional seconds portion of their local clocks to zero. This process insures that SIC device clocks are synchronized both in terms of frequency and time.

While the out of band clock synchronization signal is shown in FIG. 1 originating from SIC 120, this signal could be supplied by an external source, as an example, an external source using a high grade oscillator.

Figure 2:
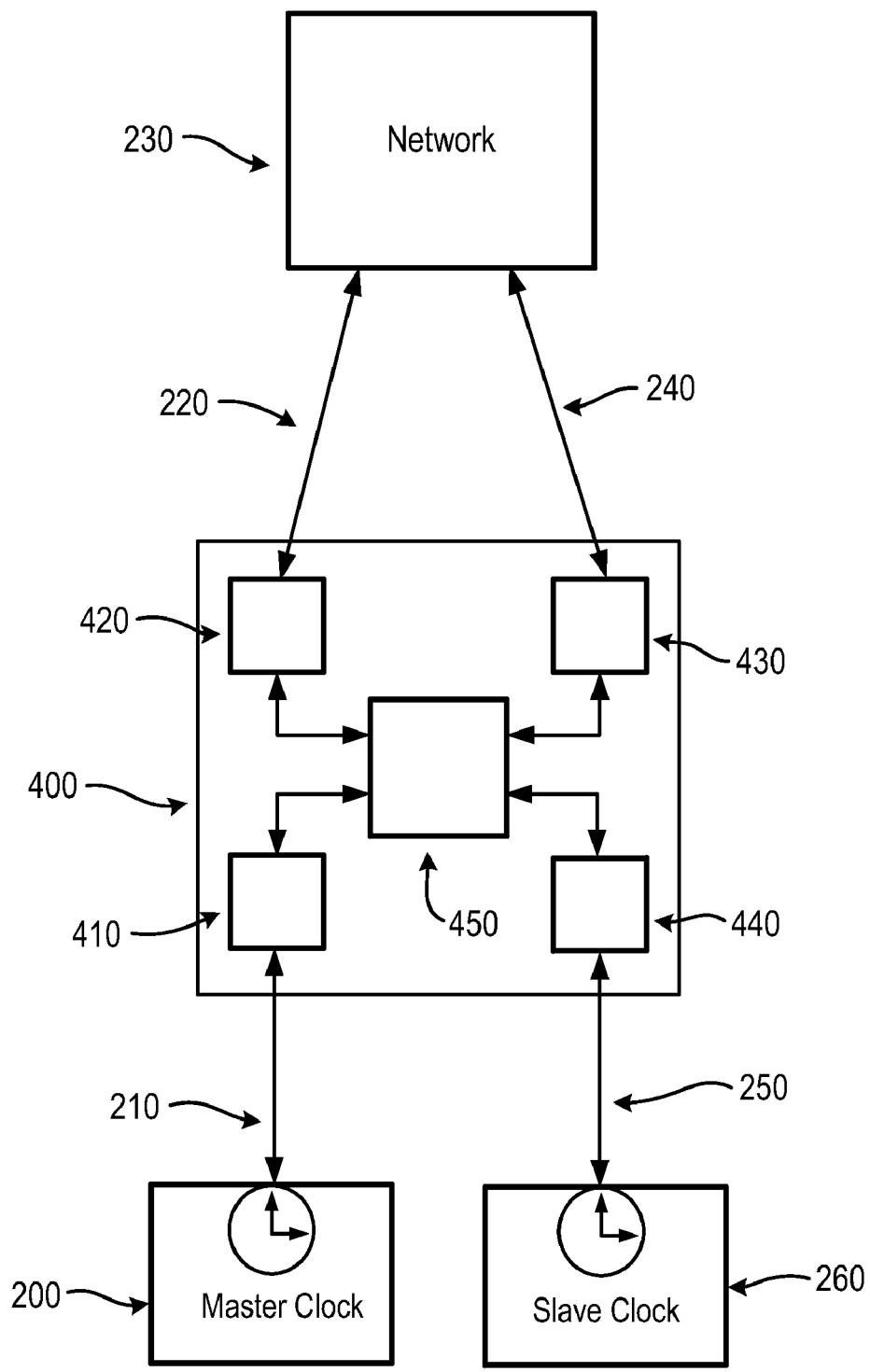
FIG. 2 shows a second system diagram.

In an alternate embodiment, SIC 120 and SIC 140 may not only be co-located, but may share logic. In such an embodiment, for example where SIC 120 and 140 share the same clock generation circuitry, the use of an out of band channel to synchronize SIC clocks is not necessary. This would be the case, for example, if multiple SIC devices were implemented on one FPGA. Such an embodiment is shown in FIG. 2. IEEE master clock 200 communicates 210 with device 400. One channel of device 400, functionally similar to SIC 120 of FIG. 1, comprises PHY 410, shared logic 450, and PHY 420. PHY 420 communicates 220 with network elements 230. A second channel of device 400, functionally similar to SIC 140 of FIG. 1, comprises PHY 430, shared logic 450, and PHY 440. This channel communicates 240 with network elements 230, and communicates 250 with IEEE 1588 slave clock 260.

Figure 3:
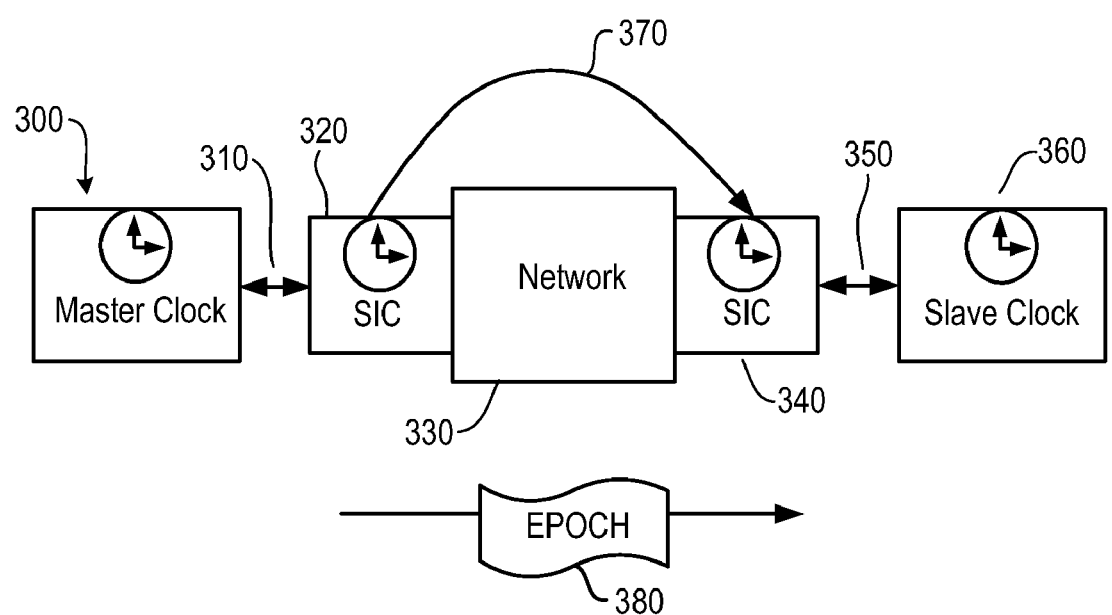
FIG. 3 shows a block diagram of a system.

An additional embodiment of the present invention is shown in FIG. 3, providing a distributed boundary block. In this embodiment, each SIC device implements the IEEE 1588 PTP protocol, establishing separate PTP sessions.

IEEE 1588 master clock 300 communicates 310 with SIC 320 which acts as an IEEE 1588 slave clock. SIC 330 acts as a IEEE 1588 master clock as it communicates 350 between network 330 and IEEE 1588 slave clock 360.

Using IEEE 1588 protocols, SIC 320 synchronizes its internal clock with that of IEEE master 300. SIC 340 acts as IEEE 1588 master clock, with IEEE 588 slave clock 360 synchronizing its clock to SIC 340.

SIC 320 synchronizes SIC 340's clock by sending periodic synch pulses via out of band link 370. SIC 320 also injects a special EPOCH packet into the datastream through network element 330 directed to SIC 340. SIC 340 uses this packet to synchronize its EPOCH. SIC 320 sends a special pulse via out of band link 370 to indicate to SIC 340 that the follow up EPOCH packet will have EPOCH data related to this event.

In an embodiment where SIC 320 and SIC 340 are co-located or share processing circuitry, such as shown in FIG. 2, the use of the out of band channel and transmission of EPOCH packets may not be necessary.

While the embodiments of the present invention have been illustrated in detail, it should be apparent that modifications and adaptations to these embodiments may occur to one skilled in the art without departing from the scope of the present invention as set forth in the following claims.

The invention claimed is:

1. Apparatus for establishing IEEE 1588 clock synchronization across a network element between an IEEE 1588 master clock and an IEEE 1588 slave clock, said apparatus comprising first and second cooperating smart interface converters wrapping the network element,
   wherein the first smart interface converter is in communication with the IEEE 1588 master clock, the second smart interface converter is in communication with the IEEE 1588 slave clock, said first and second smart interface converters providing data that allow the slave clock to compensate for delays in the network element.

2. The apparatus of claim 1 where the first and second smart interface converters communicate through an out of band link that bypasses the network element.

3. The apparatus of claim 2 where the out of band link is an electrical connection.

4. The apparatus of claim 2 where the out of band link is a fiber optic cable.

5. The apparatus of claim 2 where the out of band link is a free radiating link.

6. The apparatus of claim 5 where the free radiating link is an RF link.

7. The apparatus of claim 5 where the free radiating link is an optical link.

8. The apparatus of claim 2 where the out of band link carries signals for synchronizing the clocks of the first and second smart interface converters.

9. The apparatus of claim 8 where the first smart interface converter generates the signals for synchronizing the clocks of the first and second smart interface converters.

10. The apparatus of claim 8 where the signals for synchronizing the clocks of the first and second smart interface converters are provided by an external source.

11. An apparatus for establishing IEEE 1588 clock synchronization across a network element between an IEEE 1588 master clock and an IEEE 1588 slave clock, said apparatus comprising first and second cooperating smart interface converters wrapping the network element, the first smart interface converter in communication with the IEEE 1588 master clock, the second smart interface converter in communication with the IEEE 1588 slave clock;
   where the first and second smart interface converters cooperate to form an IEEE 1588 transparent clock wrapping the network element.

12. The apparatus of claim 11 where the cooperation between the first and second smart interface converters includes adjusting the contents of IEEE 1588 precision time protocol packets on the fly to account for delays introduced by the network element.

13. The apparatus of claim 12 where the first and second smart interface converters adjust the contents of IEEE 1588 FOLLOW UP and DELAY RES packets.

14. The apparatus of claim 11 where the cooperation between the first and second smart interface converters includes passing special follow up messages containing timestamps of intercepted packets.

15. An apparatus for establishing IEEE 1588 clock synchronization across a network element between an IEEE 1588 master clock and an IEEE 1588 slave clock, said apparatus comprising first and second cooperating smart interface converters wrapping the network element, the first smart interface converter in communication with the IEEE 1588 master clock, the second smart interface converter in communication with the IEEE 1588 slave clock;
   where the first and second smart interface converters cooperate to form an IEEE 1588 boundary clock wrapping the network element.

16. The apparatus of claim 15 where the first smart interface converter acts as an IEEE 1588 slave clock to the IEEE 1588 master clock, and the second smart interface converter acts as an IEEE 1588 master clock to the IEEE 1588 slave clock.

17. The apparatus of claim 15 where the first smart interface converter sends an epoch data packet through the network element to the second smart interface converter and signals via the out of band link that the epoch packet was sent.

18. A method of providing IEEE 1588 clock synchronization across a network element between an IEEE 1588 master clock and an IEEE 1588 slave clock comprising wrapping the network element between the IEEE 1588 master clock and the IEEE 1588 slave clock with cooperating smart interface converters, said first and second smart interface converters providing data that allow the slave clock to compensate for delays in the network element.

19. The method of claim 18 where the smart interface converters communicate through an out of band link that bypasses the network element.

20. The method of claim 18 where the smart interface converters cooperate to form a transparent clock.

21. The method of claim 20 where the cooperation between the smart interface converters includes adjusting the contents of IEEE 1588 precision time protocol packets on the fly to account for delays introduced by the network element.

22. The method of claim 21 where the smart interface converters adjust the contents of IEEE 1588 FOLLOW UP and DELAY RES packets containing timestamps of intercepted packets.

23. The method of claim 20 where the cooperation between the smart interface converters includes passing special follow up messages.

24. The method of claim 18 where the smart interface converters cooperate to form a boundary clock.

25. The method of claim 24 where a first smart interface converter establishes an IEEE 1588 slave clock relationship with the IEEE 1588 master device, and a second smart interface converter establishes an IEEE 1588 master clock relationship with the IEEE 1588 slave device.

26. The method of claim 24 where the first smart interface converter sends periodic synchronization signals to the second smart interface converter via the out of band link, and sends periodic epoch data to the second smart interface converter via the network element.

\* \* \* \* \*